United States Patent
Osby et al.

(10) Patent No.: US 11,891,463 B2
(45) Date of Patent: Feb. 6, 2024

(54) ETHYLENE-BASED POLYMERS WITH IMPROVED MELT STRENGTH AND THERMAL STABILITY

(71) Applicant: Dow Global Technologies LLC, Midland, MI (US)

(72) Inventors: John O. Osby, Lake Jackson, TX (US); Hayley A. Brown, Lake Jackson, TX (US); Mehmet Demirors, Pearland, TX (US); Carmelo Declet Perez, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 547 days.

(21) Appl. No.: 17/254,987

(22) PCT Filed: Jun. 26, 2019

(86) PCT No.: PCT/US2019/039289
§ 371 (c)(1),
(2) Date: Dec. 22, 2020

(87) PCT Pub. No.: WO2020/006104
PCT Pub. Date: Jan. 2, 2020

(65) Prior Publication Data
US 2021/0261702 A1    Aug. 26, 2021

Related U.S. Application Data

(60) Provisional application No. 62/691,238, filed on Jun. 28, 2018.

(51) Int. Cl.
C08F 210/02 (2006.01)
C08F 236/20 (2006.01)
(Continued)

(52) U.S. Cl.
CPC .............. C08F 210/02 (2013.01); C08F 2/38 (2013.01); C08F 210/06 (2013.01);
(Continued)

(58) Field of Classification Search
CPC ............................ C08F 210/02; C08F 220/40
See application file for complete search history.

(56) References Cited

U.S. PATENT DOCUMENTS 3,542,749 A    11/1970  Anspon
5,539,075 A    7/1996   Gustafsson et al.
(Continued)

FOREIGN PATENT DOCUMENTS

WO    1996/040799 A1    12/1996
WO    97/45465 A1       12/1997
(Continued)

OTHER PUBLICATIONS

Vasile, "Handbook of Polyolefins", Sep. 30, 2005, p. 923, China Petrochemical Publishing House.
(Continued)

Primary Examiner — Kregg T Brooks
Assistant Examiner — David R. Foss
(74) Attorney, Agent, or Firm — Boyle Fredrickson, S.C.

(57) ABSTRACT

An ethylene-based polymer formed from reacting at least the following: ethylene and at least one asymmetrical polyene, of Structure 1, as described herein.

10 Claims, 1 Drawing Sheet

(51) Int. Cl.
*C08L 23/08* (2006.01)
*C08F 220/40* (2006.01)
*C08F 2/38* (2006.01)
*C08F 210/06* (2006.01)

(52) U.S. Cl.
CPC ........ *C08F 236/20* (2013.01); *C08L 23/0869* (2013.01); *C08F 220/40* (2013.01); *C08L 2201/08* (2013.01); *C08L 2203/16* (2013.01); *C08L 2203/30* (2013.01); *C08L 2207/066* (2013.01)

(56) References Cited

U.S. PATENT DOCUMENTS

| | | |
|---|---|---|
| 5,763,629 A | 6/1998 | Fan et al. |
| 5,844,045 A | 12/1998 | Kolthammer et al. |
| 5,869,575 A | 2/1999 | Kolthammer et al. |
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 9,944,733 B2 | 4/2018 | Berbee et al. |
| 2003/0109643 A1* | 6/2003 | Ching .................. C08K 5/098 525/353 |
| 2008/0242809 A1 | 10/2008 | Neuteboom et al. |
| 2008/0286509 A1* | 11/2008 | Kipke .................... C08F 10/02 526/348 |
| 2009/0253878 A1 | 10/2009 | Ye et al. |
| 2012/0316284 A1* | 12/2012 | Wang .................... C08L 23/06 524/528 |
| 2015/0197590 A1 | 7/2015 | Osby |
| 2016/0297905 A1 | 10/2016 | Berbee et al. |

FOREIGN PATENT DOCUMENTS

| | | |
|---|---|---|
| WO | 01/68723 A1 | 9/2001 |
| WO | 02/14379 A1 | 2/2002 |
| WO | 2007/110127 A1 | 10/2007 |
| WO | 2012/084787 A1 | 6/2012 |
| WO | 2014/003837 A1 | 1/2014 |

OTHER PUBLICATIONS

Zhang, "Plastic Molding Process", Jan. 31, 2010, pp. 16 and 17, China Light Industry Press.
Jiannan, "Plastic Materials", Jan. 31, 1999, p. 34, China Light Industry Press.

* cited by examiner

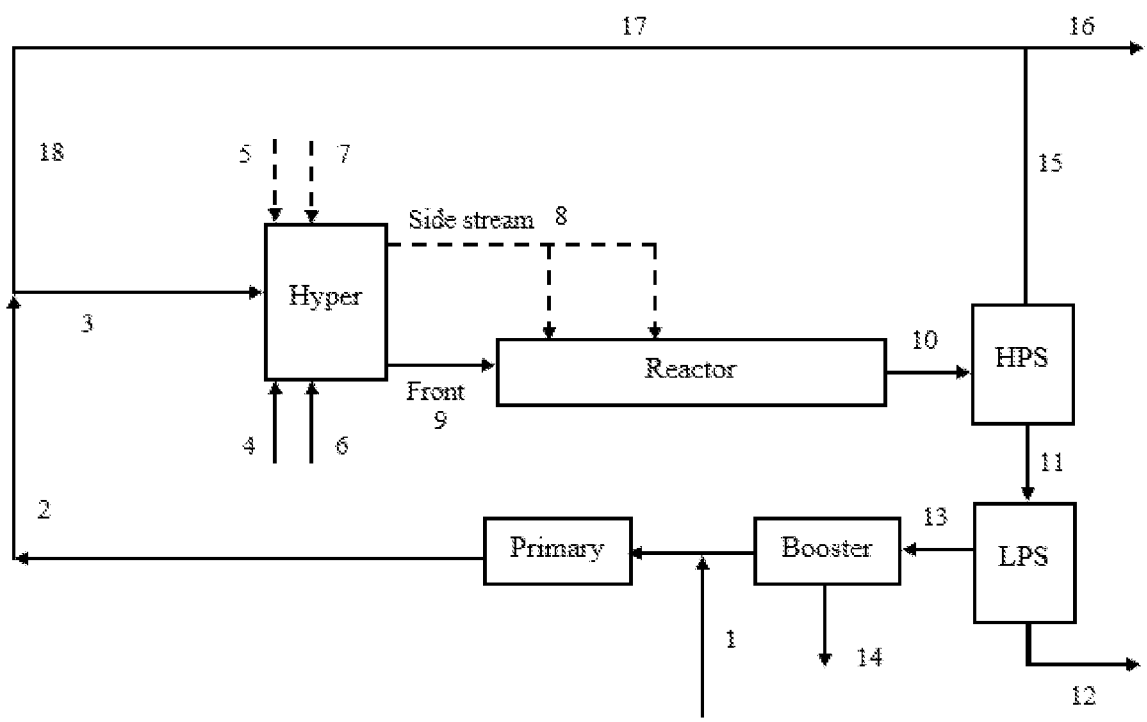

ETHYLENE-BASED POLYMERS WITH IMPROVED MELT STRENGTH AND THERMAL STABILITY

BACKGROUND

The invention relates to ethylene-based polymers, such as LDPE type polymers, with improved melt strength, and improved thermal stability for reduced taste and odor. Such polymers are useful in extrusion coating and film applications. Conventional low density polyethylene (LDPE) has good processability, however, when used in extrusion coating and film application, increased melt strength and increased thermal stability are still desired.

Low density polyethylenes are disclosed in the following references. U.S. Publication No. 2015/0197590 discloses an ethylene-based polymer formed from reacting at least the following: ethylene and at least one asymmetrical polyene, comprising an "alpha, beta unsaturated end" and a "C—C double bond end," and wherein the reaction takes place in the presence of at least one free-radical initiator. U.S. Publication No. 2008/0242809 discloses a process for the preparation of a copolymer of ethylene and a comonomer, and where the comonomer is a di- or higher functional (meth)acrylate. U.S. Pat. No. 3,542,749 discloses ethylene copolymers that contain polymerized ethylene and polymerized oleyl acrylate, erucyl acrylate, N-oleyl acrylamide, nerucyl acrylamide or any mixture thereof.

Additional polymerizations are disclosed in the following references: Tung, L. H., et al., *Preparation of Polystyrene with Long Chain Branches via Free Radical Polymerization*, J. Polym. Sci., Polym. Chem. Ed., (1981), 19, 2027-39; Tung, L. H., *Branching Kinetics in Copolymerization of Styrene with a Chain-Transfer Monomer*, J. Polym. Sci., Polym. Chem. Ed., (1981), 19, 3209-3217; Liu, J., et al., *Branched Polymer via Free Radical Polymerization of Chain Transfer Monomer: A Theoretical and Experimental Investigation*, J. Polym. Sci. Part A: Polym. Chem., (2007), 46, 1449-59; U.S. Patent Publication 2009/0253878; U.S. Pat. Nos. 5,763,629; 5,539,075; International Publication No. WO 2012/084787; International Publication No. WO 2007/110127; International Publication No. WO 97/45465.

However, as discussed, there remains a need for ethylene-based polymers with improved melt strength and improved thermal stability for used in extrusion coating and film applications. These needs have been met by the following invention.

SUMMARY OF THE INVENTION

An ethylene-based polymer formed from reacting at least the following: ethylene and at least one asymmetrical polyene of Structure 1 below:

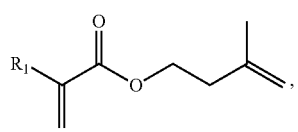

(Structure 1)

wherein R1 is selected from H or alkyl.

BRIEF DESCRIPTIONS OF THE DRAWINGS

FIG. 1 depicts a generalized flow scheme of a simulated high pressure polymerization plant configuration containing a tubular reactor.

DETAILED DESCRIPTION

Ethylene-based polymers, described herein, have been discovered, and which have excellent melt strength and thermal stability (for example, LDPE polymerized in the presence of isoprenyl methacrylate (IPMA) which is more thermally stable during melt processing than LDPE polymerized in the presence of polypropylene glycol allyl ether methacrylate (PPG AEMA)). These polymers are well suited for extrusion coating and film applications.

As discussed above, an ethylene-based polymer is provided, and formed from reacting at least the following: ethylene and at least one asymmetrical polyene of Structure 1 below:

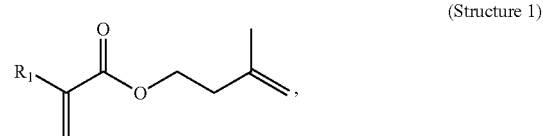

(Structure 1)

wherein R1 is selected from H or alkyl, and further H or a C1-C5 alkyl.

The ethylene-based polymer may comprise a combination of two or more embodiments as described herein.

The asymmetrical polyene may comprise a combination of two or more embodiments as described herein.

In one embodiment, or a combination of embodiments described herein, the asymmetrical polymer is an asymmetrical diene.

In one embodiment, or a combination of embodiments described herein, Structure 1 is Structure 1A:

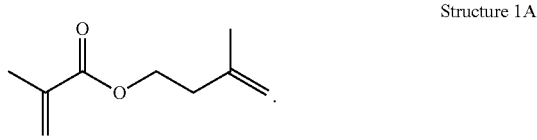

Structure 1A

In one embodiment, or a combination of embodiments described herein, the ethylene-based polymer has a density ≥0.900, or ≥0.905, or ≥0.910, grams per cubic centimeter (g/cc or g/cm$^3$). In a further embodiment, the asymmetrical polyene is an asymmetrical diene.

In one embodiment, or a combination of embodiments described herein, the ethylene-based polymer has a density ≤0.950, or ≤0.945, or ≤0.940, grams per cubic centimeter (g/cc or g/cm$^3$). In a further embodiment, the asymmetrical polyene is an asymmetrical diene.

In one embodiment, or a combination of embodiments described herein, the ethylene-based polymer has a density from 0.900 to 0.940 g/cc, or from 0.905 to 0.935 g/cc, or from 0.910 to 0.930 g/cc (1 cc=1 cm$^3$). In a further embodiment, the asymmetrical polyene is an asymmetrical diene.

In one embodiment, or a combination of embodiments described herein, the ethylene-based polymer has a melt index (I2) from 0.10 to 100 g/10 min, or from 0.50 to 80 g/10 min, or from 1.0 to 60 g/10 min, or from 5.0 to 40 g/10 min, or from 10 to 20 g/10 min. In a further embodiment, the asymmetrical polyene is an asymmetrical diene.

In one embodiment, or a combination of embodiments described herein, the ethylene-based polymer has a melt index ($I_2$) from 0.5 to 60 g/10 min, or from 1.0 to 40 g/10 min, or from 2.0 to 20 g/10 min, or from 5.0 to 10 g/10 min. In a further embodiment, the asymmetrical polyene is an asymmetrical diene.

In one embodiment, or a combination of embodiments described herein, the ethylene-based polymer has a melt index ($I_{10}$) from 45 to 100 g/10 min, or from 50 to 90 g/10 min, or from 55 to 85 g/10 min, or from 60 to 80 g/10 min. In a further embodiment, the asymmetrical polyene is an asymmetrical diene.

In one embodiment, or a combination of embodiments described herein, the ethylene-based polymer has a melt index ratio ($I_{10}/I_2$) from 8.0 to 14.0, or from 9.0 to 13, or from 10 to 11. In a further embodiment, the asymmetrical polyene is an asymmetrical diene.

In one embodiment, or a combination of embodiments described herein, the ethylene-based polymer has a melt strength (MS) $\geq 10$, or $\geq 11$, or $\geq 12$, or $\geq 13$. In a further embodiment, the asymmetrical polyene is an asymmetrical diene.

In one embodiment, or a combination of embodiments described herein, the ethylene-based polymer has a melt strength (MS) $\leq 50$, or $\leq 40$, or $\leq 30$, or $\leq 20$. In a further embodiment, the asymmetrical polyene is an asymmetrical diene.

In one embodiment, or a combination of embodiments described herein, the ethylene-based polymer has a melt strength to melt index ratio ($MS/I_2$) from 2.0 to 4.0, or from 2.4 to 3.8, or from 2.6 to 3.6, or from 2.8 to 3.4. In a further embodiment, the asymmetrical polyene is an asymmetrical diene.

In one embodiment, or a combination of embodiments described herein, the ethylene-based polymer has a molecular weight distribution (MWD) from 7.0 to 13, or from 8.0 to 12, or from 9.0 to 11. In a further embodiment, the asymmetrical polyene is an asymmetrical diene.

In one embodiment, or a combination of embodiments described herein, the ethylene-based polymer has a number average molecular weight (Mn) from 10,000 to 22,000 g/mole, or from 12,000 to 20,000 g/mole, or from 14,000 to 18,000 g/mole. In a further embodiment, the asymmetrical polyene is an asymmetrical diene.

In one embodiment, or a combination of embodiments described herein, the ethylene-based polymer has a weight average molecular weight (Mw) from 140,000 to 180,000 g/mole, or from 145,000 to 175,000 g/mole, or from 150,000 to 170,000 g/mole. In a further embodiment, the asymmetrical polyene is an asymmetrical diene.

In one embodiment, or a combination of embodiments described herein, the ethylene-based polymer has a z-average molecular weight (Mz) from 800,000 to 1,200,000 g/mole, or from 850,000 to 1,150,000 g/mole, or from 900,000 to 1,100,000 g/mole. In a further embodiment, the asymmetrical polyene is an asymmetrical diene.

In one embodiment, or a combination of embodiments described herein, the ethylene-based polymer has an OS rank, as described herein, $\leq 2$, and a VOC rank, as described herein, $\leq 3$. In a further embodiment, the asymmetrical polyene is an asymmetrical diene.

In one embodiment, or a combination of embodiments described herein, the ethylene-based polymer has a Neck-In, at a line speed of 440 fpm and a screw speed of 90 rpm, $\leq 2.0$. In a further embodiment, the asymmetrical polyene is an asymmetrical diene.

In one embodiment, or a combination of embodiments described herein, in the reaction, the asymmetrical polyene is present in an amount $\geq 100$ mass ppm, or $\geq 150$ mass ppm, or $\geq 200$ mass ppm, based on the total amount of ethylene. In a further embodiment, the asymmetrical polyene is an asymmetrical diene.

In one embodiment, or a combination of embodiments described herein, in the reaction, the asymmetrical polyene is present in an amount $\leq 5,000$ mass ppm, or $\leq 2,000$ mass ppm, or $\leq 1,000$ mass ppm, based on the total amount of ethylene. In a further embodiment, the asymmetrical polyene is an asymmetrical diene.

In one embodiment, or a combination of embodiments described herein, the ethylene-based polymer is a low density polyethylene comprising, in reacted form, the polyene. In a further embodiment, the asymmetrical polyene is an asymmetrical diene.

In one embodiment, or a combination of embodiments described herein, the ethylene-based polymer comprises, in polymerized form, ethylene and the polyene as the only monomer types. In a further embodiment, the asymmetrical polyene is an asymmetrical diene.

In one embodiment, or a combination of embodiments described herein, the ethylene-based polymer comprises at least one structure selected from Structure I:

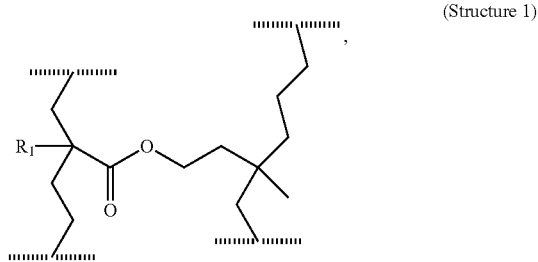

(Structure 1)

wherein R1 is selected from H or an alkyl. In a further embodiment, the asymmetrical polyene is an asymmetrical diene.

In the above Structure I, the notation "ɪɪɪɪɪɪɪɪ" represents a break at the center of a covalent carbon-carbon bond in the hydrocarbon backbone of the ethylene-based polymer.

In one embodiment, or a combination of embodiments described herein, the ethylene-based polymer comprises, in reacted form, $\geq 0.075$ moles, or $\geq 0.100$ moles, or $\geq 0.150$ moles, or $\geq 0.200$ moles of the asymmetrical polyene per 1000 moles of ethylene-based polymer backbone carbons, based on the weight of the polymer. In a further embodiment, the asymmetrical polyene is an asymmetrical diene.

In one embodiment, or a combination of embodiments described herein, the ethylene-based polymer comprises, in reacted form, $\leq 10.0$ moles, or $\leq 5.00$ moles, or $\leq 2.00$ moles, or $\leq 1.00$ moles asymmetrical polyene per 1000 moles of ethylene-based polymer back bone carbons, based on the weight of the polymer. In a further embodiment, the asymmetrical polyene is an asymmetrical diene.

In one embodiment, or a combination of embodiments described herein, the ethylene-based polymer comprises, in reacted form, $\leq 2.00$ moles, or $\leq 1.50$ moles, or $\leq 1.00$ moles, or ≤0.500 moles of the asymmetrical polyene per 1000 moles of ethylene-based polymer backbone carbons, based on the weight of the polymer. In a further embodiment, the asymmetrical polyene is an asymmetrical diene.

In one embodiment, or a combination of embodiments described herein, the ethylene-based polymer comprises, in reacted form, ≥0.03 wt %, or ≥0.04 wt %, or ≥0.05 wt % of the asymmetrical polyene, based on the weight of the polymer. In a further embodiment, the asymmetrical polyene is an asymmetrical diene.

In one embodiment, or a combination of embodiments described herein, the ethylene-based polymer comprises, in reacted form, ≤1.5 wt %, or ≤1.2 wt %, or ≤1.0 wt %, or ≤0.8 wt %, or ≤0.6 wt %, or ≤0.4 wt % of the asymmetrical polyene, based on the weight of the polymer. In a further embodiment, the asymmetrical polyene is an asymmetrical diene.

In one embodiment, or a combination of embodiments described herein, the ethylene-based polymer comprises, in reacted form, ≤0.50 wt %, or ≤0.20 wt %, or ≤0.10 wt % of the asymmetrical polyene, based on the weight of the polymer. In a further embodiment, the asymmetrical polyene is an asymmetrical diene.

In one embodiment, or a combination of embodiments described herein, the ethylene-based polymer comprises ethylene and at least one asymmetrical polyene as the only monomeric units. In a further embodiment, the asymmetrical polyene is an asymmetrical diene.

In one embodiment, or a combination of embodiments described herein, the ethylene-based polymer comprises ethylene and at least two asymmetrical polyenes as the only monomeric units. In a further embodiment, each asymmetrical polyene is an asymmetrical diene.

In one embodiment, or a combination of embodiments described herein, the ethylene-based polymer comprises ethylene and one asymmetrical polyene as the only monomeric units. In a further embodiment, the asymmetrical polyene is an asymmetrical diene.

In one embodiment, or a combination of embodiments described herein, the ethylene-based polymer comprises ethylene and two asymmetrical polyenes as the only monomeric units. In a further embodiment, each asymmetrical polyene is an asymmetrical diene.

Also provided is a composition comprising the ethylene-based polymer of any one or more embodiments described herein.

In one embodiment, or a combination of embodiments described herein, the composition further comprising at least one other polymer. In a further embodiment, the other polymer that differs from the inventive ethylene-based polymer in one or more properties, for example, density, melt index (I2), Mw, Mn or Mw/Mn.

In one embodiment, or a combination of embodiments described herein, the at least one other polymer is a linear low density ethylene/alpha-olefin copolymer. In a further embodiment, the linear low density ethylene/alpha-olefin copolymer has a density from 0.910 to 0.940 g/cc, and a melt index (I2) from 0.5 to 50 g/10 min.

The invention also provides an article comprising at least one component formed from an inventive composition.

In one embodiment, or a combination of embodiments described herein, the article is a film or a coating.

In one embodiment, or a combination of embodiments described herein, the article is a film.

In one embodiment, or a combination of embodiments described herein, the article is a coating.

An inventive ethylene-based polymer may comprise a combination of two or more embodiments as described herein.

An inventive composition may comprise a combination of two or more embodiments as described herein.

An inventive article may comprise a combination of two or more embodiments as described herein.

The invention also provides a process to form an inventive ethylene-based polymer, as described herein, the process comprising polymerizing ethylene in the presence of the asymmetrical polyene as described above.

In one embodiment, or a combination of embodiments described herein, the ethylene is polymerized in the presence of at least 50 mole ppm (based on amount of total monomers in reaction feed) of the asymmetrical polyene. In a further embodiment, the asymmetrical polyene is an asymmetrical diene.

In one embodiment, or a combination of embodiments described herein, the polymerization pressure ≥100 MPa. In a further embodiment, the polymerization takes place at a polymerization pressure from 150 MPa to 350 MPa. In a further embodiment, the polymerization takes place at a temperature from 100° C. to 380° C. In a further embodiment, the process takes place in a reactor configuration comprising at least one tubular reactor.

In one embodiment, or a combination of embodiments described herein, the polymerization takes place at a temperature from 100° C. to 380° C. In a further embodiment, the process takes place in a reactor configuration comprising at least one tubular reactor.

In one embodiment, or a combination of embodiments described herein, the polymerization takes place in a reactor configuration comprising at least one tubular reactor or at least one autoclave.

In one embodiment, or a combination of embodiments described herein, the polymerization takes place in a reactor configuration comprising at least one autoclave.

In one embodiment, or a combination of embodiments described herein, the polymerization takes place in a reactor configuration comprising at least one tubular reactor.

In one embodiment, or a combination of embodiments described herein, the polymerization takes place in a reactor configuration comprising at least one tubular reactor and at least one autoclave reactor.

In one embodiment, or a combination of embodiments described herein, the asymmetrical diene is added to the polymerization in an amount from 0.002 to 0.300 mole percent, further from 0.005 to 0.300 mole percent, based on the total moles of ethylene and asymmetrical diene added to the polymerization.

An inventive process may comprise a combination of two or more embodiments as described herein.

Process

For producing an inventive ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave or tubular reactors, each having one or more reaction zones, or in a combination of autoclave and tubular reactors, each having one or more reaction zones.

Often a conventional chain transfer agent is used to control molecular weight. In a preferred embodiment, one or more conventional chain transfer agents (CTAs) are added to an inventive polymerization process. Typical CTA that can be used include, but are not limited to, propylene, isobutane, n-butane, 1-butene, methyl ethyl ketone, acetone, ethyl acetate, propionaldehyde, ISOPAR (ExxonMobil Chemical Co.), and isopropanol. In one embodiment, or a combination of embodiments described herein, the amount of CTA used in the process is from 0.03 to 10 weight percent of the total reaction mixture.

In one embodiment, or a combination of embodiments described herein, the process includes a process recycle loop to improve conversion efficiency. In one embodiment, or a combination of embodiments described herein, the polymerization may take place in a tubular reactor, as described in international patent application PCT/US12/059469, filed Oct. 10, 2012. This patent application describes a multi zone reactor, which describes alternate locations of feeding fresh ethylene, to control the ethylene to CTA ratio, and therefore control polymer properties. Fresh ethylene may be simultaneously added, in multiple locations, to achieve the desired ethylene to chain transfer ratio. In a similar way, the addition of fresh CTA may be carefully selected to control polymer properties as described in international patent application PCT/US12/064284 (filed Nov. 9, 2012). Fresh CTA may be simultaneously added in multiple locations to achieve the desired CTA to ethylene ratio. Likewise, the addition points, and the amount of, the fresh polyene, described herein, may be used to control gels formation, while maximizing the desired property of increased melt strength and performance in targeted applications. Fresh polyene may be simultaneously added in multiple locations, to achieve the desired polyene to ethylene ratio. The use of the polyene to broaden molecular weight distribution and to increase the melt strength will put further requirements on the distribution of the CTA and the polyene along a reactor system, in order to achieve the desired change in product properties, with minimizing potential negative impacts, like gel formation, reactor fouling, process instabilities, low efficiency of polyene.

In one embodiment, or a combination of embodiments described herein, the polymerization takes place in a reactor configuration comprising at least one autoclave reactor and at least one tubular reactor. In the multi reactor system, the autoclave reactor usually precedes the tubular reactor. The addition points and amounts of fresh ethylene, fresh CTA, and fresh polyene may be appropriately controlled, to achieve the desired ratios of CTA to ethylene, and polyene to ethylene, in the feeds to, and/or in, the reaction zones.

In one embodiment, or a combination of embodiments described herein, the asymmetrical diene is added to the polymerization in an amount from 0.002 to 0.300 mole percent, further from 0.005 to 0.300 mole percent, based on the total moles of ethylene and asymmetrical diene added to the polymerization. In a further embodiment, the polymerization takes place in two reactors. In another embodiment, the polymerization takes place in one reactor with multiple or at least two reaction zones.

Ethylene used for the production of ethylene-based polymer may be purified ethylene, which is obtained by removing polar components from a loop recycle stream, or by using a reaction system configuration, such that only fresh ethylene is used for making the inventive polymer. It is not typical that purified ethylene is required to make ethylene-based polymer. In such cases ethylene from the recycle loop may be used.

In one embodiment, or a combination of embodiments described herein, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

In one embodiment, or a combination of embodiments described herein, the ethylene-based polymer comprises ethylene and at least one asymmetrical polyene as the only monomeric units.

Initiators

Free radical initiators are generally used to produce the inventive ethylene-based polymers. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxy initiators are used in an amount from 0.001 to 0.2 weight percent, based upon the weight of polymerizable monomers.

In one embodiment, or a combination of embodiments described herein, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent of the combined weight of one or more additives, based on the weight of the inventive polymer.

In one embodiment the ethylene-based polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers of this invention may be employed in a variety of conventional thermoplastic fabrication processes to produce useful articles, including monolayer and multilayer films; molded articles, such as blow molded, injection molded, or rotomolded articles; coatings, such as extrusion coatings; fibers; and woven or non-woven fabrics.

An inventive polymer may be used in a variety of films, including but not limited to, clarity shrink films, collation shrink films, cast stretch films, silage films, stretch hood, sealants, and diaper backsheets. Other suitable applications include, but are not limited to, wires and cables, gaskets and profiles, adhesives; footwear components, and auto interior parts.

Definitions

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises 50 wt % or a majority amount of polymerized ethylene, based on the weight of the polymer, and, optionally, may comprise at least one comonomer.

The term "ethylene-based interpolymer" refers to an interpolymer that comprises 50 wt % or a majority amount of polymerized ethylene, based on the weight of the interpolymer, and comprises at least one comonomer.

The term "ethylene-based copolymer" refers to a copolymer that comprises 50 wt % or a majority amount of polymerized ethylene, based on the weight of the copolymer, and a comonomer, as the only monomer types.

The term "propylene-based polymer" refers to a polymer that comprises a majority amount of polymerized propylene, based on the weight of the polymer, and, optionally, may comprise at least one comonomer.

The term "reaction zone," as used herein, refers to a reactor zone where polymerization reaction is initiated or reinitiated by the addition of free radicals or components which dissociate into and/or generate free radicals. Typically, the reaction medium is heated and/or cooled by a heat transfer medium flowing through a jacket around the reactor. A reaction zone may also start with the addition of fresh and/or recycled ethylene, and free radicals or components which dissociate into and/or generate free radicals.

The term "fresh," when used herein, in reference to an ethylene-based feed component (i.e., "fresh ethylene," "fresh CTA," "fresh polyene"), refers to reactant provided from an external source(s), and not provided internally from a recycled source(s).

The term "reactor system," as used herein, refers to the devices used to polymerize and isolate a polymer. Such devices include, but are not limited to, one or more reactors, reactor pre-heater(s), monomer-reactor cooling device(s), Hyper-compressor(s), Primary compressor(s), and/or Booster compressor(s).

The term "reactor configuration," as used herein, refers to one or more reactors, and optionally one or more reactor pre-heaters, ethylene feed cooling device, used to polymerize a polymer. Such reactors include, but are not limited to, autoclave reactor(s), tubular reactor(s), and combinations of autoclave and tubular reactors.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density

Samples that were measured for density were prepared according to ASTM D 1928. Samples were pressed at 374° F. (190° C.), and 30,000 psi, for three minutes, and then at 70° F. (21° C.) and 30,000 psi for one minute. Density measurements were made within one hour of sample pressing, using ASTM D792, Method B.

Melt Index

Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes.

Melt Strength

Melt strength was measured at 190° C. using a Goettfert Rheotens 71.97 (Goettfert Inc.; Rock Hill, SC). The melted sample (about 25 to 50 grams) was fed with a Goettfert Rheotester 2000 capillary rheometer, equipped with a flat entrance angle (180 degrees), and of length of 30 mm and diameter of 2 mm. The sample was fed into the barrel (L=300 mm, Diameter=12 mm), compressed, and allowed to melt for 10 minutes, before being extruded at a constant piston speed of 0.265 mm/s, which corresponds to a wall shear rate of 38.2 $s^{-1}$ at the given die diameter. The extrudate passed through the wheels of the Rheotens, located at 100 mm below the die exit, and was pulled by the wheels downward, at an acceleration rate of 2.4 $mm/s^2$. The force (in cN) exerted on the wheels was recorded as a function of the velocity of the wheels (in mm/s). Samples were repeated at least twice, until two curves of the force (in cN) as a function of strand velocity (in mm/s) superimpose, then the curve that had the highest velocity at the strand break was reported. Melt strength was reported as the plateau force (cN) before the strand broke.

Dynamic Mechanical Spectroscopy (DMS)

Resins were compression-molded into "3 mm thick×1 inch" circular plaques at 350° F., for 6.5 minutes, under 20,000 $lb_f$, in air. The sample was then taken out of the press, and placed on the counter to cool.

A constant temperature frequency sweep was performed, using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate was removed), and then the test was started. The method had an additional five minute delay built in, to allow for temperature equilibrium. The experiments were performed at 190° C., over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were measured.

Triple Detector Gel Permeation Chromatography (TDGPC)

The chromatographic system consisted of a PolymerChar GPC-IR (Valencia, Spain) high temperature GPC chromatograph, equipped with an internal IR5 infra-red detector (IR5) coupled to a Precision Detectors (Now Agilent Technologies) 2-angle laser light scattering (LS) detector Model 2040, and followed by a PolymerChar 4-capillary viscosity detector (three detectors in series). For all light scattering measurements, the 15 degree angle was used for measurement purposes. The autosampler oven compartment was set at 160° Celsius, and the column compartment was set at 150° Celsius. The columns used were four, Agilent "Mixed A" columns, each 30 cm, and each packed with 20-micron linear mixed-bed particles. The chromatographic solvent used was 1,2,4-trichlorobenzene, which contained 200 mass ppm of butylated hydroxytoluene (BHT). The solvent source was nitrogen sparged. The injection volume was 200 microliters, and the flow rate was 1.0 milliliters/minute.

Calibration of the GPC column set was performed with 21 narrow molecular weight distribution, polystyrene standards with molecular weights ranging from 580 to 8,400,000 g/mol. These standards were arranged in 6 "cocktail" mixtures, with at least a decade of separation between individual molecular weights. The standards were purchased from Agilent Technologies. The polystyrene standards were prepared at "0.025 grams in 50 milliliters of solvent" for molecular weights equal to, or greater than, 1,000,000 g/mol, and at "0.05 grams in 50 milliliters of solvent" for molecular weights less than 1,000,000 g/mol. The polystyrene standards were dissolved at 80 degrees Celsius, with gentle agitation, for 30 minutes. The polystyrene standard peak molecular weights (IR 5 detector) were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQN 1)},$$

where M is the molecular weight, A has a value of 0.4315, and B is equal to 1.0.

A fifth order polynomial was used to fit the respective polyethylene-equivalent calibration points. A small adjustment to A (from approximately 0.415 to 0.44) was made to correct for column resolution and band-broadening effects, such that NIST standard NBS 1475 was obtained at 52,000 g/mol (Mw).

The total plate count of the GPC column set was performed with EICOSANE (prepared at 0.04 g in 50 milliliters of "TCB stabilized solvent," and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2, \quad \text{(EQN 2)}$$

where RV is the retention volume in milliliters, the peak width is in milliliters, the peak max is the maximum height of the peak, and ½ height is the ½ height of the peak maximum:

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad \text{(EQN 3)}$$

where RV is the retention volume in milliliters, and the peak width is in milliliters, "Peak max" is the maximum IR signal height corresponding to an "RV position" on the chromatogram, "One tenth height" ¹⁄₁₀ height of the peak maximum, where "Rear peak" refers to the peak tail at a signal retention volume (at ¹⁄₁₀ height of peak maximum), later than the peak max, and where "Front peak" refers to the peak front at a signal retention volume (at ⅒ height of peak maximum), earlier than the peak max. The plate count for the chromatographic system should be greater than 24,000, and the symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. Decane (a flow rate marker) was added to each sample (about 5 microliters). The samples were dissolved for two hours at 160° Celsius, under a "low speed" shaking.

IR 5 Chromatogram

The calculations of Mn(conv), Mw(conv), and Mz(conv) were based on the GPC results, using the internal IR5 detector (measurement channel) of the PolymerChar GPC-IR chromatograph, according to Equations 4-6, using PolymerChar GPCOne™ software (version 2013G), the baseline-subtracted IR chromatogram at each equally-spaced data collection point (i), and the polyethylene equivalent molecular weight obtained from the narrow standard calibration curve for the point (i) from Equation 1. Table 3 lists the conventional GPC results for the examples and comparative examples using Equations 4-6, below for the conventional GPC.

$$Mn_{(conv)} = \frac{\sum_i IR_i}{\sum_i (IR_i/M_{polyethylene_i})}, \quad (\text{EQN 4})$$

$$Mw_{(conv)} = \frac{\sum_i (IR_i * M_{polyethylene_i})}{\sum_i IR_i}, \quad (\text{EQN 5})$$

$$Mz_{(conv)} = \frac{\sum_i (IR_i * M_{polyethylene_i}^2)}{\sum_i (IR_i * M_{polyethylene_i})}, \quad (\text{EQN 6})$$

In order to monitor the deviations over time, a flowrate marker (decane) was introduced into each sample via a micropump controlled with the PolymerChar GPC-IR system. This flowrate marker (FM, here decane) was used to linearly correct the pump flowrate (Flowrate(nominal)) for each sample, by aligning the RV value of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate(effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system based on a flow marker peak, the effective flowrate (with respect to the narrow standards calibration) was calculated using Equation 7. Processing of the flow marker peak was done via the PolymerChar GPCOne™ Software. Acceptable flowrate correction was such that the effective flowrate should be within +/−2% of the nominal flowrate.

Flowrate(effective)=Flowrate(nominal)*(RV(FM Calibrated)/RV(FM Sample)) (EQN 7).

The Systematic Approach for the determination of multi-detector offsets was done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)). Alignment of the triple detector log (MW and IV) results (generated from a broad homopolymer polyethylene standard (Mw/Mn=3)), to the narrow standard column calibration results (generated from the narrow standards calibration curve), was done using the PolymerChar GPCOne™ Software.

Light Scattering Chromatogram

The absolute molecular weight data (MWabs) was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)), using the PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight (traceable to NBS 1475 homopolymer polyethylene reference sample). The calculated molecular weights (using GPCOne™) were obtained using a light scattering constant, derived from one or more of the polyethylene standards mentioned below, and a refractive index concentration coefficient, do/dc, of 0.104. Generally, the mass detector response (IR5) and the light scattering constant (determined using GPCOne™) should be determined from a linear standard with a molecular weight in excess of about 50,000 g/mol. Table 5 lists the light scattering GPC results for the examples and comparative examples.

The Equation for Mw(abs) is an area-based result, using the baseline-subtracted 15 degree light scattering signal and the baseline-subtracted IR5 measurement sensor signal (applying the mass and light scattering constants), as determined from GPCOne™ software, $$Mw_{(abs)} = \frac{\sum_i LS_i}{\sum_i IR_i} \times \text{Mass Constant}/LS \text{ constant}. \quad (\text{EQN 8A})$$

The equation for Mz(abs) relied on a point-by point determination of the absolute molecular weight derived from the ratio of the baseline-subtracted, 15 degree light scattering signal and the baseline-subtracted, IR5 measurement sensor signal, and factored for the mass constant and light scattering constant, using GPCOne™ software. A straight-line fit was used to extrapolate the absolute molecular weight, where either detector (IR5 or LS) is below approximately 4% relative peak signal height (maximum peak height).

$$Mz(abs) = \frac{\sum_i (IR_i * M_{Abs_i}^2)}{\sum_i (IR_i * M_{Abs_i})}. \quad (\text{EQN 8B})$$

Viscosity Chromatogram

The absolute intrinsic viscosity data (IV(abs)) was obtained using the area of the specific viscosity chromatogram, obtained from the PolymerChar viscometer detector, when calibrated to the known intrinsic viscosity of NBS 1475. The overall injected concentration, used in the determination of the intrinsic viscosity, was obtained from the mass detector area and the mass detector constant, derived from a suitable linear polyethylene homopolymer, or one of the polyethylene standards of known intrinsic viscosity (traceable to NBS 1475 homopolymer polyethylene reference sample).

The equation for IV(abs) is an area-based result using the baseline-subtracted specific-viscosity signal (DV) and the baseline-subtracted IR5 measurement sensor signal (applying the mass and viscosity constants), as determined from GPCOne™ software:

$$IV_{(Abs)} = \frac{\sum_{i} DV_i}{\sum_{i} IR_i} \times (\text{Mass Constant/Viscosity constant}). \quad \text{(EQN 8C)}$$

Differential Scanning calorimetry (DSC)

Differential Scanning calorimetry (DSC) can be used to measure the melting and crystallization behavior of a polymer over a wide range of temperatures. For example, the TA Instruments Q2000 DSC, equipped with an RCS (refrigerated cooling system) and an autosampler is used to perform this analysis. During testing, a nitrogen purge gas flow of 50 ml/min is used. Each sample is melt pressed into a thin film at about 190° C.; the melted sample is then air-cooled to room temperature (~25° C.). The film sample was formed by pressing a "0.5 to 0.9 gram" sample at 190° C. at 20,000 lb$_f$ and 10 seconds, to form a "0.1 to 0.2 mil thick" film. A 3-10 mg, six mm diameter specimen was extracted from the cooled polymer, weighed, placed in an aluminum pan (about 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves are recorded. The cooling curve was analyzed by setting baseline endpoints from the beginning of crystallization to −20° C. The heating curve was analyzed by setting baseline endpoints from −20° C. to the end of melting. The values determined were peak melting temperature (Tm), peak crystallization temperature (Tc), heat of fusion (Hf) (in Joules per gram), and the calculated % crystallinity for ethylene-based polymer samples using the following equations: % Crystallinity=((Hf)/(292 J/g))×100 (EQN 16).

The heat of fusion and the peak melting temperature are reported from the second heat curve. The peak crystallization temperature is determined from the cooling curve.

Nuclear Magnetic Resonance ($^1$H NMR)

Each NMR sample was prepared by adding approximately "0.10 g of ethylene-based polymer" to "2.7 g of tetrachloroethane-d$_2$ (TCE), containing 0.001 M Cr(AcAc)$_3$ (tris(acetylacetonato)-chromium(III))" in a "NORELL 1001-7 10 mm NMR tube." The samples were purged by bubbling nitrogen through the solvent via a pipette, inserted into the tube for approximately five minutes, to prevent oxidation, and then they were capped, sealed with TEFLON tape, and then soaked at room temperature overnight to facilitate sample dissolution. The samples were kept in a nitrogen purge box during storage, before, and after, preparation to minimize exposure to oxygen. The samples were heated and mixed with a vortex mixer at 115° C. to ensure homogeneity. Each sample was visually inspected to ensure homogeneity.

The data were collected using a BRUKER AVANCE 400 MHz NMR Spectrometer, equipped with a BRUKER DUAL DUL high-temperature CRYOPROBE, at a sample temperature of 120° C. Each analysis was run with a ZG pulse, 32 scans, SWH 10,000 Hz, AQ 1.64 s, and D1 14 s. Acquisitions were repeated using a D1 of 28s to check quantitation, and results were equivalent.

GC Analysis

Water Extraction and Preparation for Headspace-Solid Phase Microextraction (HS-SPME)

Each film was prepared, as described in the Experimental section, under "Extrusion Coating." Two grams (about 1 in by 1 in) of each sample (approx. 1.3 mil polymer coated onto release liner, which was removed to provide a free standing film) were sample were weighed into individual "20 mL" headspace vials, and the vials were sealed. Vials with films were equilibrated at 75° C. for 10 minutes, and the headspace was extracted by SPME for analysis by gas chromatography with a quadrupole mass spectrometer (GC/qMS).

Preparation for HS-SPME

Ten grams of each film (see above) were weighed into "40 mL" glass bottles (I-Chem, high purity). The vials were completely filled with high purity water (ASTM Type I, Reagent grade, Mill-Q Integral 3, 18.2 MΩ, <5 ppb TOC). The vials were sealed with PTFE lined caps and the film was extracted for 48 h at 40° C. After 48 hours, the bottles were removed from the oven and the contents were allowed to return to room temperature (approximately 4 h). HS-SPME analysis was performed using 20 mL headspace vials. Each vial was prepared with "3.5 g" of sodium sulfate (Sigma-Aldrich, ACS Reagent grade, purified by heating in a furnace at 1050° F. for 12 hours) and 10 grams of water extract (no film). The mixture was vigorously mixed and sonicated for 15 minutes to dissolve the sodium sulfate. The vials were then equilibrated at 75° C. for 10 min, and the headspace was extracted by SPME for analysis by gas chromatography with a quadrupole mass spectrometer (GC/qMS).

GC/ODP/qMS Analysis Conditions

The headspace in each vial was sampled by SPME and analyzed by GC/qMS. Quantitation was performed using an external standard calibration procedure. Automated sample analysis was performed using a Gerstel Multipurpose Sampler (MPS), an Agilent 7890A gas chromatography, and an Agilent 5975C inert XL quadrupole mass spectrometer. The MPS was controlled using Gerstel's Maestro software. Control and data collection of the GC/qMS was performed using Agilent's Chemstation software. The headspace of the water extracts was samples using a "2 cm×50/30 µm" divinylbenzene/carboxen/polydimethylsiloxane (Supleco) SPME fiber with equilibrated of the water at 75° C., with agitation for 10 minutes. The components on the SPME fiber were desorbed in split/splitless inlet at 250° C., followed by separation using an Agilent, VF-WAXms, "30 m×250 µm×0.5 µm" capillary column, with an oven temperature program of 50°

C. (2 minute hold) to 260° C. (6 minute hold), at 15° C./min, and an initial column flow of 2.0 mL/min of helium.

Samples were then comparatively ranked on a scale of 1-5 (with 1 indicating the least and 5 indicating the most) of the detected oxygenated species (OS) or the total volatile organic compounds (VOC) in the material.

EXPERIMENTAL

Synthesis of Isoprenyl Methacrylate (IPMA)

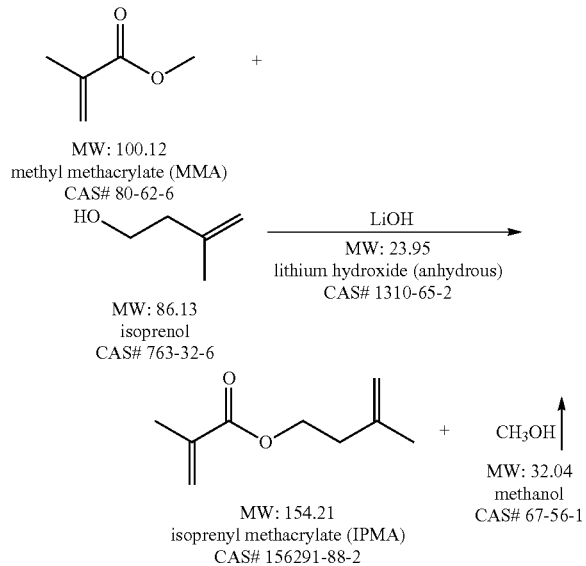

A 1000 mL, five-neck, LabMax reactor vessel was fitted with an overhead stirrer, a thermocouple, and 8% O2/N2 purge tube, and a 10-plate Oldershaw distillation column/distillation head, with an automated reflux splitter/controller. The flask was charged with 86.5 g isoprenol (1.0 mol) and 321 g of MMA (3.2 mol). Inhibitors (MEHQ and 4-HT) were added to the flask contents, in a concentration of 1040 ppm and 85 ppm in the final product, respectively. A sparge tube was turned on at the rate of 1-2 bubble/sec.

Azeotropic Drying Under Atmospheric Pressure

The reaction vessel was heated, in distillation mode, using the LabMax unit, with settings of Tj=140° C. and Tj−Tr=30° C. The LabMax unit maintained the vessel temperature around 106-107° C., and vapor temperature was maintained around 92-99° C. for the duration of the distillation. Some water droplets were observed in the return tube. After 30 minutes of reflux, 55 mL of distillate were removed using a reflux ratio of 2.5:1 (40% collection). The reaction vessel was then cooled to 40° C.

Transesterification

To the reactor vessel contents described above, anhydrous LiOH (0.49 g, 0.02 mol) was added. The flask pressure was maintained at 760 mm Hg, using a vent to air. The pot contents were heated, using setting Tj=140° C., Tj−Tr=27° C., and vessel temperature steadily increased from 105° C. to 120° C., as the distillate was removed. The vapor temperature dropped from 71° C. to 64° C., at the initial reflux. When the vapor temperature reached 64.0° C., the MMA-methanol azeotrope was distilled off using a reflux ratio of 30/70. After one hour, about 50 mL of distillate were collected, and the vapor temperature rose to 75° C. The vessel contents were cooled to 50° C., and sampled for NMR analysis. Proton NMR of the vessel contents revealed that isoprenol conversion was >99%.

MMA Removal

The pressure was reduced to 40 mmHg, and the vessel contents were heated, using setting Tj=140° C., Tj−Tr=27° C., and the vessel temperature steadily increased from 50° C. to 105° C., as the MMA was removed. The MMA was collected using a 30/70 reflux ratio at a vapor temperature range of 30-32° C. Note: such reflux ratio found to be important to reduce/avoid the loss of IPMA during MMA stripping phase. When vapor temperature rose above 50° C., the vessel contents were cooled to 50° C., and the pressure released to atmospheric pressure. Approximately "140 grams of MMA" were collected.

Filtration of Catalyst

The vessel contents were cooled over three hours to 0° C., using setting Tr=0° C., and held at that temperature for one hour, and then filtered over medium fine P4 filter paper. Approximately 146 grams (95% yield) of IPMA were produced with >97.5% purity, as determined by proton NMR spectroscopic analysis.

Distillation of IPMA

Upon the removal of the MMA, the pressure was lowered to less than 5 mmHg, and the vessel contents were heated, using Tj=110° C., Tj−Tr=27° C., and the vessel temperature steadily increased from 50° C. to 75° C., as the IPMA distilled overhead at a vapor temperature range of 49-52° C. Distilled IPMA weighed 147 grams (95% yield), with the purity >98.5%.

Polymerizations

Asymmetrical Diene—Isoprenyl Methacrylate (IPMA) was loaded into a 316 stainless steel supply vessel, and diluted with ethyl acetate, to produce a final concentration of 7.8 wt %. This vessel was purged with nitrogen for three hours before use, and kept under 70 psig nitrogen pad during operation.

Initiators—Peroxide initiator tert-butyl peroxyacetate (TPA, 20% by weight solution in ISOPAR™ H), and peroxide initiator di-tert-butyl peroxide (DTBP, 20% by weight solution in ISOPAR™ H), were combined with ISOPAR E, in a second 316 stainless steel supply vessel, to produce "1500 mass ppm" TPA and "415 mass ppm" DTBP (a ratio of 4:1 mole TPA:mole DTBP). The vessel was padded and de-padded, five times, with 70 psig nitrogen before use, and kept under nitrogen pad during the polymerization.

Ethylene was injected at 5480 g/hr, at a pressure of 1930 bar, into an agitated (1600 rpm), 300 mL, high pressure CSTR reactor, with an external heating jacket set at 220° C. Propylene (CTA) was added to the ethylene stream at a pressure of 62 bar, and at a rate of 232 g/hr, before the mixture was compressed to 1930 bar, and injected into the reactor (see above). The solution of IPMA in ethyl acetate was pumped at a pressure of 1930 bar, and at a rate of 2.79 g/hr into the ethylene-propylene mixture, before said mixture was injected into the reactor. The peroxide initiator was added directly to the reactor, through the sidewall, at a pressure of 1930 bar, and at a rate of $5.5 \times 10^{-2}$ g/hr (0.42 millimoles/hr) of TPA and $1.5 \times 10^{-2}$ g/hr (0.1 millimoles/hr) of DTBP. The ethylene conversion to polymer was 9.2 wt %, based on the mass of ethylene entering the reactor, and the average reaction temperature was around 220° C. An ethylene-based polymer (LDPE/IPMA, Inv. 1) was formed. The polymerization conditions are summarized below in Table 1. Properties of the polymers are shown in Tables 2-4 below.

Control—See reactor (316 stainless steel supply vessel) and initiators described above. Ethylene was injected at 5452 g/hr, at a pressure of 1930 bar, into an agitated (1600 rpm) 300 mL high pressure CSTR reactor, with an external heating jacket set at 220° C. Propylene (chain transfer agent) was added to the ethylene stream, at a pressure of 62 bar, and at a rate of 120 gm/hr, before the mixture was compressed to 1930 bar, and injected into the reactor. The peroxide initiator mixture was added directly to the reactor through the sidewall of the CSTR reactor, and at a pressure of 1930 bar, and at a rate of $5 \times 10^{-2}$ gm/hr (0.4 millimoles/hr) of TPA and $1.4 \times 10^{-2}$ gm/hr (0.1 millimoles/hr) of DTBP. The ethylene conversion to polymer was 11.2 wt %, based on the mass of ethylene entering the reactor, and the average reaction temperature was around 221° C. Reaction polymerization conditions are summarized below in Table 1. Properties of the polymers are shown in Tables 2-4 below.

For the extrusion coating evaluation, a constant 15.2 cm (6 inches) air gap was set for all resins. The die gap was set to "20 mil," however small adjustments were needed to maintain a constant coating thickness. The temperatures in each zone of the extruder were 177, 232, 288, and 316° C. (die) (350, 450, 550 and 600° F. (die)), respectively, leading to a target melt temperature of 318° C. (605° F.). The screw speed was "90 rpm," resulting in "250 lb/hr" output rate. Line speed was at "440 ft/min (fpm)," resulting in a "1.3 mil" coating onto a "50 lb/ream" KRAFT paper (the width of the KRAFT paper was 61 cm (24 inches); unbleached). A free standing piece of polymer film for analytical testing (e.g., HS-SPME) was obtained by coating the resin onto a release liner. A piece of silicon coated release liner approximately "61 cm (24 inches)" wide was inserted between the

TABLE 1

Polymerization Conditions

| | Ethylene (g/hr) | Propylene (g/hr) | t-butyl peroxy-acetate (g/hr) | di-t-butyl peroxide (g/hr) | Assym. diene (g/hr) | Reaction Temp. (° C.) | Ethylene Conversion (wt %) | Ethylene-Based Polymer Collected (g/hr) |
|---|---|---|---|---|---|---|---|---|
| Control | 5452 | 120 | 0.38 | 0.08 | 0 | 221 | 12.1 | 660 |
| IPMA | 5480 | 232 | 0.18 | 0.04 | 2.79 | 220 | 11.6 | 636 |

Polymer Properties

Polymer properties are listed in Tables 2 and 3 below.

polymer coating and the paper substrate, before the molten polymer curtain touched the paper substrate, to form a

TABLE 2

Polymer Properties

| Example | Resin | $I_2$ (dg/min) | $I_{10}$ (dg/min) | MS (cN, 190 C.) | MS/I2 | OS* rank | VOC* rank |
|---|---|---|---|---|---|---|---|
| Comp. A | LDPE 5004i*** | 4.1 | 47.2 | 7.7 | 1.9 | 1 | 1 |
| Comp. B | LDPE/PPG AEMA** | 3.5 | 46.3 | 8.1 | 2.3 | 5 | 5 |
| Control | LDPE | 4.3 | 47.4 | 12.4 | 2.9 | 1 | 2 |
| Inv. 1 | LDPE/IPMA | 6.7 | 70.4 | 13.0 | 3.2 | 2 | 3 |

*OS = oxygenated species (OS);
VOC = total volatile organic compounds.
**See WO2014/003837.
***Commercially available from The Dow Chemical Company.

TABLE 3

Polymer Properties

| Example | Mn (g/mol) | Mw (g/mol) | Mz (g/mol) | Mw/Mn |
|---|---|---|---|---|
| Comp. A | 14,209 | 128,781 | 559,913 | 9.06 |
| Comp. B | 13,217 | 91,000 | 347,813 | 6.89 |
| Control | 18,156 | 154,022 | 779,991 | 8.48 |
| Inv. 1 | 16,296 | 163,032 | 992,483 | 10.00 |

Extrusion Coating

All coating experiments were performed on a Black-Clawson Extrusion Coating Line. The extruder was equipped with a 3.5 inch, 30:1 L/D, 4:1 compression ratio single flight screw, with two spiral Mattock mixing sections. The nominal die width of 91 cm (36 inches) was deckled (metal dam to block the flow in the die at the die exit around the outer edges of the die, and used to decrease the die width, and thus decrease the polymer flow out of the die), to an open die width of 61 cm (24 inches). In extrusion coating, a deckle is a die insert that sets the coating width of a slot die coater or the extrusion width of an extrusion die. It work by constraining the flow as the material exits the die.

"polymer coating/release liner/KRAFT paper" configuration, in which the paper and release liner are not adhered to each other. The "polymer coating/release liner" sub-configuration was rolled, and wrapped in food grade aluminum foil. The solidified polymer coatings were detached from the release liner for analytical testing.

The amount of neck-in (the difference in actual coating width versus deckle width (61 cm)) was measured at line speeds of "440 feet per min" and "880 feet per minute (fpm)," resulting in a "1.3 mil" and a "0.65 mil" coating thickness, respectively. Amperage and Horse Power of the extruder were recorded. The amount of backpressure was also recorded for each polymer, without changing the back pressure valve position. Draw down is the line speed, at which edge imperfections on the polymer coating (typically the width of the polymer coating oscillating along the edges of the polymer coating) were noticed, or the line speed, at which the molten curtain completely tears from the die. A reduced rate draw down (RRDD) was measured for all resins at "45 rpm" screw speed, by ramping up the line speed, until edge imperfections or web tear was noticed. Extrusion coating results are shown in Table 4 below.

TABLE 4

Extrusion Coating Results

| Example | 440 NI | 880 NI | RRDD | HP | AMPS | PRESS |
|---|---|---|---|---|---|---|
| Comp. A | 2 | 1.875 | 840 | 24 | 126 | 1088 |
| Comp. B | 2.5 | 2.375 | 700 | 24 | 122 | 1085 |
| Control | 2.75 | 2.5 | 925 | 26 | 130 | 1142 |
| Inv. 1 | 2 | nd | 625 | 23 | 120 | 999 |

440-NI = Neck-in at line speed of 440 fpm and screw speed of 90 rpm.
880 NI = Neck-in at line speed of 880 fpm and screw speed of 90 rpm.
RRDD = Reduced rate draw down at screw speed of 45 rpm.
HP = Horse power.
AMPS = Amperage.
PRESS = Back pressure in psi.

As seen in Tables 2-4 above, the inventive polymer (Inv. 1, LDPE/IPMA) has excellent melt strength (MS), excellent thermal stability (low OS and VOC levels), and good extrusion coating properties. As compared to the PPG AEMA-containing resin, the inventive polymer (LDPE/IPMA) was more thermally stable during melt processing than Comp. B (LDPE/PPG AEMA), and did not decompose into chemical species that produce pungent odors during processing, and which could also impart bad taste and odor to foodstuff.

Description of Flow Diagram (Tubular Reactor)

FIG. 1 shows a generalized flow scheme of a high pressure polymerization plant configuration containing a tubular reactor. Stream (1) is the fresh ethylene make-up, which is compressed together with the outlet of the Booster by the Primary to stream (2). Stream (2) is combined with high pressure recycle stream (18) and fed (3) and distributed over the suction inlets of the Hyper. The Hyper pressurizes the ethylene feed streams to a level sufficient to feed the high pressure tubular reactor (Reactor). Although not depicted, the flow scheme could include partial combination and/or distribution of the stream (2) and stream (18) over the inlets of the Hyper.

Stream (4) and/or (5) depicts the CTA system make-up feed. The CTA make-up can, in principle, be freely distributed over the main compression streams fed and/or distributed over the side stream (8) and front stream (9). CTA make-up streams (4) and/or (5) can be fed in the inlet(s), interstage(s), outlet(s) of the Hyper and/or inlet(s) of the reaction zones. The CTA system can consist of single and/or multiple components and include varying compositions.

Stream (6) and/or stream (7) depict the polyene feed. The polyene feed can, in principle, be freely distributed over the main compression streams fed to and/or distributed over the side stream (8) and/or front stream (9). Polyene streams (6) and/or (7) can be fed in the inlet(s), interstage(s), outlet(s) of the Hyper, individual ethylene feed streams to the reactor, and/or directly into the reaction zones. The discharge temperature of the Hyper is typically in the range of 60 to 100° C. The ethylene feed to the first reaction zone is typically preheated to a temperature from 130 to 180° C., while the ethylene of the side feed is fed to the reactor at the Hyper discharge temperature or cooled prior to feeding to the reactor.

The dimensions and configuration of the Reactor can be as follows: Inside tube diameter from 40 to 60 mm and Rx-zone length (distribution) from 1000 to 200 m. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone.

After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and cleaned in stream (17). Stream (16) is a purge stream to remove impurities and/or inerts. The polymer separated in LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary.

The invention claimed is:

1. An ethylene-based Polymer formed from reacting ethylene and at least one asymmetrical polyene, of Structure 1A below:

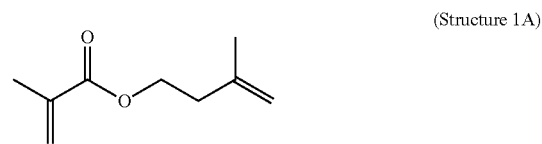

(Structure 1A)

wherein the ethylene-based polymer has
(i) a z-average molecular weight (Mz) from 800,000 g/mole to 1,200,000 g/mole;
(ii) a melt strength (MS) from greater than or equal to 10 cN to less than or equal to 40 cN (at 190° C.); and
(iii) a melt index (I2) from 5.0 g/10 min to 10 g/10 min.

2. The ethylene-based polymer of claim 1, wherein the ethylene-based polymer has a weight average molecular weight (Mw) from 145,000 to 175,000 g/mole.

3. The ethylene-based polymer of claim 2, wherein the ethylene-based polymer has a molecular weight distribution (MWD) 8.0 to 12.

4. An ethylene-based Polymer formed from reacting ethylene and at least one asymmetrical polyene, of Structure 1A below:

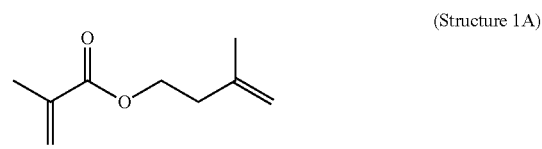

(Structure 1A)

wherein the ethylene-based Polymer has
(i) a z-average molecular weight (Mz) from 800,000 g/mole to 1,200,000 g/mole;

(ii) a melt strength (MS) from greater than or equal to 10 cN to less than or equal to 40 cN (at 190° C.); and (iii) a melt index ($I_{10}$) from 50 g/10 min to 90 g/10 min.

5. The ethylene-based polymer of claim 4, wherein the ethylene-based polymer has a melt index ratio ($I_{10}/I_2$) from 9.0 to 13.

6. The ethylene-based polymer of claim 4, wherein the ethylene-based polymer has a melt strength to melt index ratio ($MS/I_2$) from 2.0 to 4.0.

7. The ethylene-based polymer of claim 4, wherein the polymer has a density from 0.905 g/cc to 0.935 g/cc.

8. The ethylene-based polymer of claim 4, wherein the ethylene-based polymer comprises, in reacted form, greater than or equal to 0.01 wt % to less than or equal to 0.20 wt % of the asymmetrical polyene, based on the weight of the ethylene-based polymer.

9. A process comprising:
    extrusion coating an ethylene-based polymer onto a substrate, the ethylene-based polymer formed from reacting ethylene and at least one asymmetrical polyene, of Structure 1A below:

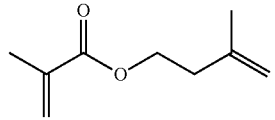
(Structure 1A)

wherein the ethylene-based Polymer has
   (i) a z-average molecular weight (Mz) from 800,000 g/mole to 1,200,000 g/mole;
   (ii) a melt strength (MS) from greater than or equal to 10 cN to less than or equal to 40 cN (at 190° C.); and
   (iii) a melt index (I2) from 5.0 g/10 min to 10 g/10 min; and
   forming a coating composed of the ethylene-based polymer on the substrate.

10. The process of claim 9, comprising extrusion coating at a line speed of 440 fpm and a screw speed of 90 rpm; and forming a coating with a neck-in of less than or equal to 2.0 inches.

* * * * *